(12) United States Patent
Knobel

(10) Patent No.: US 8,388,324 B2
(45) Date of Patent: Mar. 5, 2013

(54) DEVICE FOR METERING OUT A FLOWABLE MASS USING A COAXIAL ROTARY PISTON AND PLUNGER

(75) Inventor: Guido Knobel, Felben (CH)

(73) Assignee: KMB Produktions AG, Felben (CH)

( * ) Notice: Subject to any disclaimer, the term of this patent is extended or adjusted under 35 U.S.C. 154(b) by 505 days.

(21) Appl. No.: 12/523,895

(22) PCT Filed: Jan. 22, 2008

(86) PCT No.: PCT/EP2008/000460
§ 371 (c)(1),
(2), (4) Date: Jan. 15, 2010

(87) PCT Pub. No.: WO2008/089954
PCT Pub. Date: Jul. 31, 2008

(65) Prior Publication Data
US 2010/0140302 A1    Jun. 10, 2010

(30) Foreign Application Priority Data

Jan. 22, 2007 (DE) .......................... 10 2007 011 015

(51) Int. Cl.
*F04B 53/16* (2006.01)
*F04B 7/00* (2006.01)
*F04B 1/00* (2006.01)
*F04B 15/02* (2006.01)

(52) U.S. Cl. ........ 417/515; 417/519; 417/521; 222/271; 222/275; 222/309

(58) Field of Classification Search .................. 417/492, 417/521, 515, 519; 222/139, 380, 271, 275, 222/309
See application file for complete search history.

(56) References Cited

U.S. PATENT DOCUMENTS

| | | | | | |
|---|---|---|---|---|---|
| 2,510,317 | A | * | 6/1950 | Perkins | 222/255 |
| 2,972,435 | A | * | 2/1961 | McCarty | 222/309 |
| 3,583,603 | A | * | 6/1971 | Freckmann et al. | 222/137 |
| 3,605,645 | A | | 9/1971 | Herrmann | |
| 4,341,329 | A | * | 7/1982 | Kuemmerer et al. | 222/275 |
| 4,358,257 | A | * | 11/1982 | Seiler et al. | 417/517 |
| 4,431,384 | A | * | 2/1984 | Walser | 417/360 |
| 4,545,507 | A | * | 10/1985 | Barall | 222/137 |
| 4,667,709 | A | * | 5/1987 | Fischer et al. | 141/91 |
| 4,830,068 | A | * | 5/1989 | Langenhahn et al. | 141/266 |
| 4,854,837 | A | | 8/1989 | Cordray | |
| 4,860,926 | A | * | 8/1989 | Juenkersfeld et al. | 222/148 |

(Continued)

FOREIGN PATENT DOCUMENTS

DE          1936358          2/1971

(Continued)

*Primary Examiner* — Charles G Freay
*Assistant Examiner* — Nathan Zollinger
(74) *Attorney, Agent, or Firm* — Bachman & LaPointe, P.C.

(57) ABSTRACT

A device for metering out a flowable mass, especially a mass containing fat, for producing confectionery products, for example to a nozzle for extruding a mass into a mold. The mass traverses an inlet opening (13) and enters a chamber (8) from where it can be extruded through an outlet opening (14) by a plunger (7). A rotary piston (12) is associated with the plunger (7) and closes the outlet opening (14) in a position of use and the inlet opening (13) in a second position of use. The rotary piston (12) has a recessed portion (16 to 19) which extends from a front edge (15) of the rotary piston (12) towards its peripheral surface (25).

10 Claims, 3 Drawing Sheets

U.S. PATENT DOCUMENTS

| | | | |
|---|---|---|---|
| 5,014,882 A * | 5/1991 | Dennis et al. | 222/309 |
| 5,482,448 A | 1/1996 | Atwater et al. | |
| 6,360,920 B1 * | 3/2002 | Corominas | 222/262 |
| 6,733,256 B1 * | 5/2004 | Knobel | 417/521 |
| 6,814,109 B2 * | 11/2004 | Rohret et al. | 141/89 |
| 2008/0311237 A1 | 12/2008 | Steiner et al. | |

FOREIGN PATENT DOCUMENTS

| | | |
|---|---|---|
| DE | 3630528 | 3/1988 |
| DE | 29706282 | 8/1997 |
| DE | 19934106 | 1/2001 |
| DE | 102005004785 | 9/2006 |

* cited by examiner

DEVICE FOR METERING OUT A FLOWABLE MASS USING A COAXIAL ROTARY PISTON AND PLUNGER

BACKGROUND OF THE INVENTION

The invention relates to a device for metering out a flowable mass, especially a fat-containing mass for the production of confectionery products, for example to a nozzle for extruding the mass into a mold, the mass making its way through an inlet opening into a chamber, from which it can be extruded through an outlet opening by means of a plunger, and the plunger being assigned a rotary piston, which in one usage position shuts off the outlet opening and in a further usage position shuts off the inlet opening, which rotary piston has a recess.

Chocolate candies, for example, consist in many cases of a chocolate casing and a chosen filling and are today produced automatically in the industrial field by so-called one-shot technology. In this method, the chocolate is introduced into a mold through a single nozzle, for example through an annular duct, and, at the same time, a filling is introduced through an axial bore, the filling pressing the chocolate casing against the mold wall, so that a closed chocolate candy is produced from casing with filling by a single "shot".

The corresponding substances for the casing and the filling are brought to the nozzles by means of pumps, a pump being respectively assigned to a nozzle on a nozzle bar. These rows of pumps are in turn connected to a single lifting bar, so that the lifting motion of the pump plungers is realized by the motion of the lifting bar. In the lifting bar are also seated rotary elements, which rotate the pump plunger respectively about 180°.

Arrangements of this type are described, for example, in DE 297 06 282 U1 and DE 199 34 106 A1. The flowable mass makes its way through an inlet opening into a metering chamber, which is formed by a part of the pump plunger being cut away parallel to the axis and being pierced in this region. This produces in the pump plunger a delimited cavity, between which and an inner wall of a pump a certain quantity of substance can be accommodated. As soon as the metering chamber, and a space between the floor of the cylinder chamber and the end face of the pump plunger, is filled with substance, the pump plunger is rotated about 180°, so that the cavity is assigned to an outlet opening. If the pump plunger is now plunged deeper into the cylinder chamber, then the space between the end face of the pump plunger and the floor of the cylinder chamber is reduced, so that the substance is forced out of this space into the cavity and a corresponding quantity of substance makes its way through the outlet opening.

The nearest prior art is constituted by DE 1 936 358, in which a valveless, continuously adjustable pump for the metering of liquids is described. With this, liquids can be metered for the treatment of textiles contaminated with fibers. To this end, two interconnected pistons are present in a pump cylinder, one of which has a metering function and the other of which performs an oscillatory motion. The pistons are provided on their front side with profiles, which are situated in one or more planes. In one piston there is a curved bore, which can selectively be connected to an inlet or outlet.

The object of the present invention is to improve the metering of the flowable mass and to facilitate the introduction of the flowable mass into the cylinder chamber and from the cylinder chamber, the flowable mass also being able to contain larger items.

SUMMARY OF THE INVENTION

The object is achieved by the fact that the recess is configured as an open slot.

This means that, when the rotary piston is rotated, the recess always remains open with the same opening toward the plunger or its front edge. In this regard, it is also possible to enlarge the recess such that flowable mass containing larger items, such as nuts, can be better conveyed. According to the invention, the recess is therefore configured as an open slot. This has proved advisable also from the production engineering aspect.

In a preferred illustrative embodiment of the invention, the recess in the rotary piston has a certain shape. It possesses a conchoidal inner vault, which is delimited from the plunger by a horseshoe-like front edge. From the corners of the front edge, side edges then run toward the rear and join up. This conchoidal inner vault has, on the one hand, the advantage that the flowable mass, when it is put under pressure by the pump plunger, is led directly to the outlet opening. The front edge itself offers hardly any resistance to the flowable mass, especially as the front edge can be chamfered in the style of a cutting edge.

The straight side edges further have the advantage that, if they are likewise chamfered, they cut off a strand of the flowable mass in a knife-like manner, both at the inlet opening and at the outlet opening. The chosen shape of the inlet and outlet openings is of subordinate importance. It can be round, but, above all, also oval.

In order to reduce dead spaces, it is provided that the plunger or a part of the plunger reaches at least partially into the recess. In a simple illustrative embodiment, an attachment can be mounted for this purpose on the end face of the plunger, which attachment fits into the recess.

In another illustrative embodiment of the invention, the possibility exists that the pump housing forms in the interior an annular edge, against which the rotary piston abuts. Up to this annular edge, the rotary piston has an external diameter which corresponds to the corresponding internal diameter of the chamber in the pump housing before the annular edge. The plunger, on the other hand, has a reduced external diameter, which corresponds to the internal diameter of the chamber in the pump housing after the annular edge. In this way, the plunger can travel to a certain extent into the recess.

The above-mentioned annular edge does not need to be shaped in the pump housing directly by machine-cutting. It can also be formed by a separate sleeve. In addition, it could be formed by virtue of a two-part configuration of the plunger, to be precise having an outer plunger, which in this case is sleeve-shaped, and an inner plunger, which is movable in the outer plunger and with its front region reaches beyond the outer plunger into the recess of the rotary piston.

A further part of the present invention, for which protection is also desired, consists in the fact that a rotational axis of the rotary piston runs in an axis of the plunger. There it is even preferred that the rotational axis of the rotary piston and the axis of the plunger run in a longitudinal axis of a chamber of the pump housing.

This means that the whole of the pumping work is allocated to the plunger and the rotary piston. As a result, the handling of the plunger, in particular, is facilitated and the necessary energy for the pumping motion is reduced. In addition, a more accurate metering becomes possible. The plunger forms a closed front edge, and the opposite-situated rotary piston, by virtue of its fixed arrangement in the pump housing, likewise forms a precisely defined, limited counterbearing to the end face of the plunger. If, as a result of an appropriate rotary motion of the rotary piston, for example, the inlet opening is open, then the motion of the plunger away from the rotary piston sucks an exact quantity of flowable mass into the cylinder chamber, while, in the prior art, the flowable mass must itself be put at least partially under pressure in order to fill the whole of the cavity in the pump plunger.

If now, for the discharge of the flowable mass, the rotary piston is rotated and opens up the outlet opening, then, as a result of the smooth end face of the piston, an exactly defined quantity of flowable mass can be discharged from the outlet opening. Contrary to the prior art, by virtue of the present invention, the flowable mass is thus not pushed back and forth in the cylinder chamber, but is sucked into the cylinder chamber by the plunger and pushed out again through the outlet opening. As a result, the metering is substantially improved and the force absorption of the plunger reduced. Moreover, non-flowable material remains for a lengthy period in the cylinder chamber, as was possible in the front region of the plunger cavity according to the prior art.

Preferably, the pump housing, together with the rotary piston and the drive unit for the rotary piston, should be fixedly mounted. In this case, only the plunger is moved in the direction of the longitudinal axis of the pump housing. However, the relative motion of rotary piston and plunger, or even the fixed arrangement of the plunger and the motion of the rotary piston in the longitudinal axis of the pump housing together with its drive unit, also lies within the scope of the invention. Each of these options is intended to be covered by the invention.

In a preferred illustrative embodiment, the rotary piston is adjoined by a gearwheel engaging with a movable gear rack. The rotary motion of the rotary piston is hereby induced.

Since a plurality of pump housings are generally combined into a pump block, it will prove advisable to assign a common drive to the corresponding rotary pistons and a common lifting bar to the corresponding pump plungers.

BRIEF DESCRIPTION OF THE DRAWINGS

Further advantages, features and details of the invention emerge from the following description of a preferred illustrative embodiment and with reference to the drawing, wherein.

DETAILED DESCRIPTION

Figure 1:
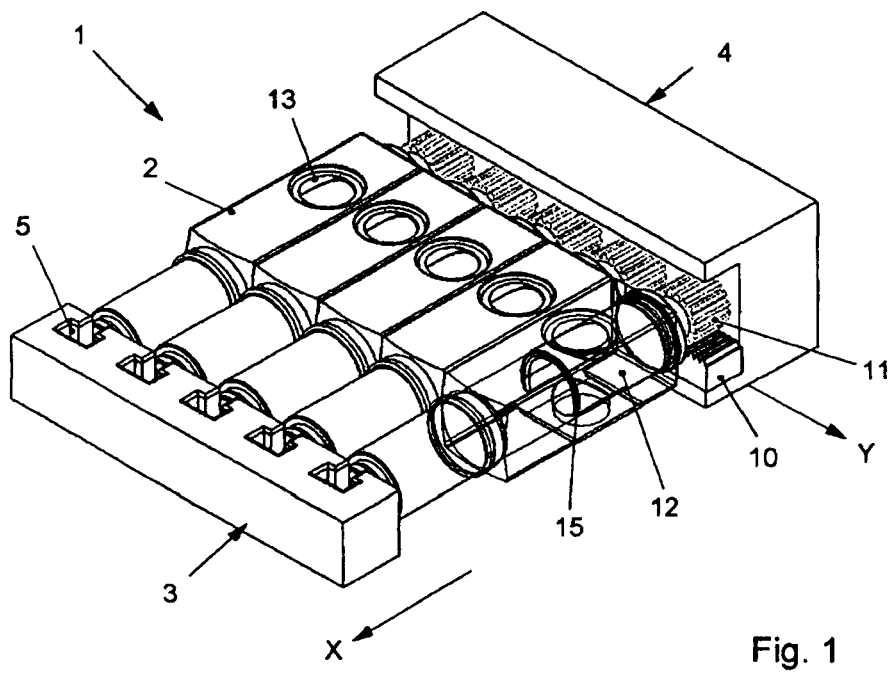
FIG. 1 shows a perspective view, in partially translucent representation, of a device according to the invention for metering out a flowable mass.
Figure 2:
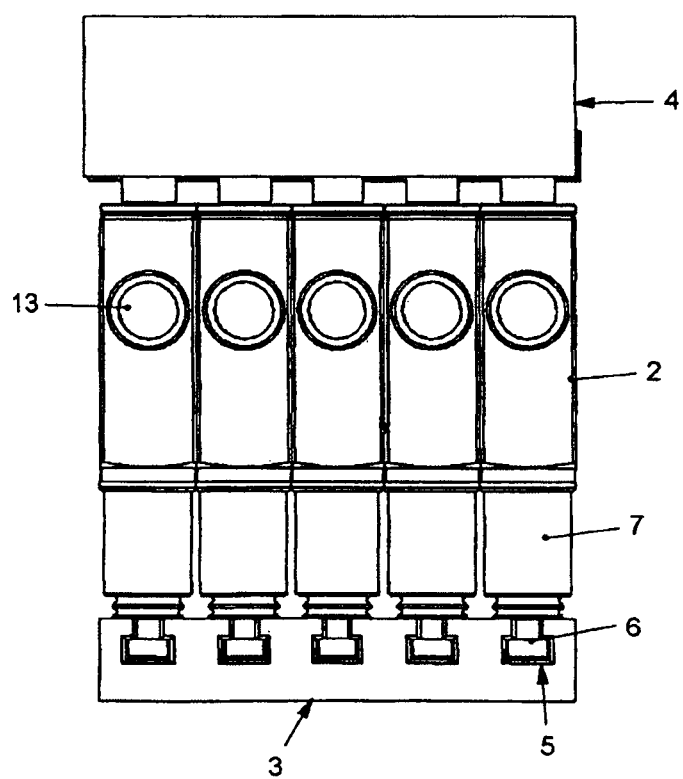
FIG. 2 shows a top view of the device according to FIG. 1.

In FIGS. 1 and 2 is shown a pump block 1 consisting of a plurality of mutually adjacent pump housings 2. This pump block 1 is located between a lifting bar 3, movable in the direction x, and a drive bar 4.

Figure 4:
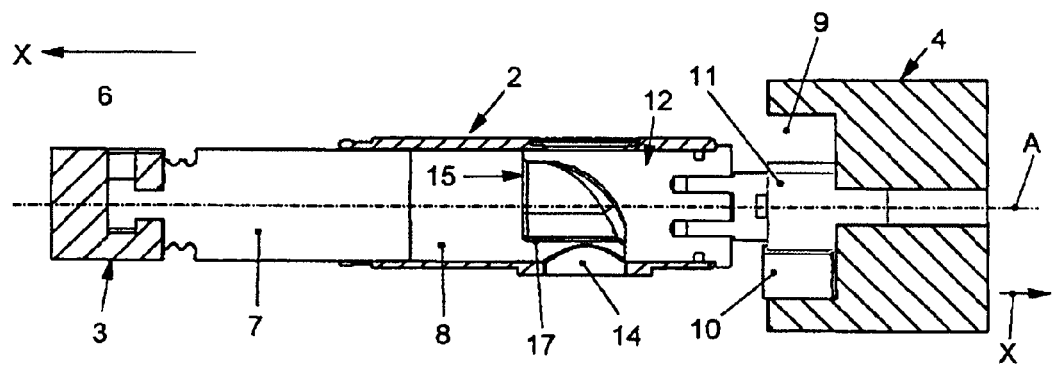
FIG. 4 shows a cross section through FIG. 2, in enlarged representation, with the rotary piston in another usage position.

The lifting bar 3 has a plurality of T-shaped grooves 5, which respectively serve to receive a T-shaped sliding block 6. Connected to the sliding block 6 is a plunger 7, which reaches into a cylinder chamber 8 (see, in particular, FIG. 4) in the pump housing 2.

In a receiving channel 9 of the drive bar 4 there is inserted a gear rack 10, which cooperates with a plurality of gearwheels 11. Each gearwheel 11 is connected in a rotationally secure manner to a rotary piston 12 located opposite the plunger 7 in the pump housing 2. The rotary piston 12 can be rotated in the pump housing 2 about a rotational axis D running in the longitudinal axis A of the pump housing 2. Similarly, an axis B of the plunger 7 lies in the longitudinal axis A of the pump housing 2.

The working method of the present invention is as follows:

A flowable mass, for example a chocolate mass, is introduced through an inlet opening 13 into the pump housing 2 and the cylinder chamber 8. To this effect, the rotary piston 12 is in its usage position shown in FIG. 3, in which it opens up the inlet opening 13 while shutting off an outlet opening 14. The rotary piston 12 here has opposite the plunger 7 a front edge 15, which, as can be seen in FIG. 1, is shaped like a horseshoe. From respectively one free corner 16 of the front edge 15, a side edge 17 extends roughly horizontally toward the rear, so that a conchoidal inner vault 18 is produced inside the rotary piston 12. A corresponding vault roof 19 is matched in its outer contour to an inner contour of the cylinder chamber 8 and thus covers, according to the rotation of the rotary piston 12, either the inlet opening 13 or the outlet opening 14. When the rotary piston 12 is rotated into one or other usage position, the side edge 17 respectively cuts off a strand of the flowable mass entering through the inlet opening 13 or exiting through the outlet opening 14.

Figure 3:
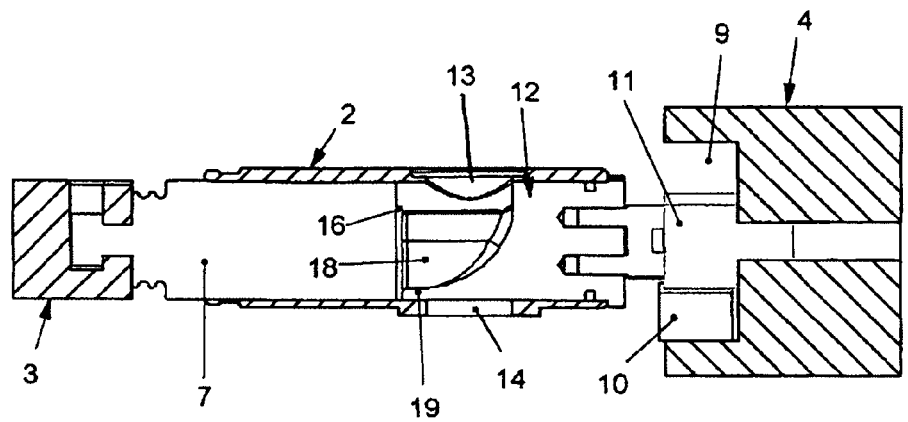
FIG. 3 shows a cross section through FIG. 2, in enlarged representation, with a rotary piston in a usage position.

If the rotary piston 12 is in the usage position shown in FIG. 3, only the cylinder chamber 8 is enlarged by motion of the lifting bar 3 in the direction of pull x. As a result, the plunger 7 sucks the flowable mass through the inlet opening 13 into the interior of the cylinder chamber 8, so that a precise volume can be metered into the cylinder chamber 8 by the plunger 7. When the desired volume of flowable mass is present in the cylinder chamber 8, the rotary piston 12 is rotated about 180° by movement of the gear rack 10 in the direction y, so that, according to FIG. 4, it shuts off the inlet opening 13, while opening the outlet opening 15.

The lifting bar 3 is now moved counter to the direction x, so that the plunger 7 forces the flowable mass out of the cylinder chamber 8, the flowable mass, as a result of the conchoidal inner vault 18 facing the outlet opening 14, being forced out of the cylinder chamber 8 very quickly and without great additional pressurization of the plunger 7.

Figure 5:
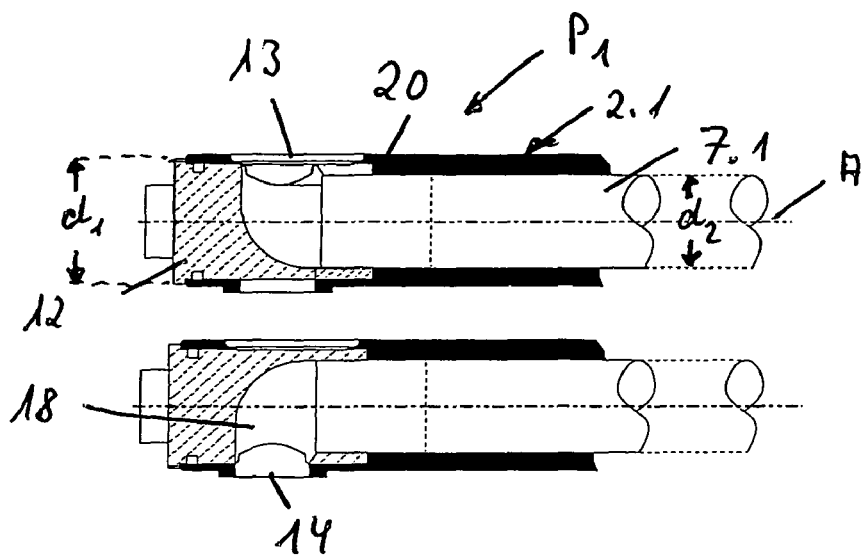
FIGS. 5 to 7 show schematically represented longitudinal sections through further embodiments of pumps in respectively two different usage positions.

In FIG. 5, a further illustrative embodiment of a pump P1 according to the invention, for which protection is independently requested, is shown in two different usage positions. In a pump housing 2.1, the plunger 7 is located slidably along the longitudinal axis A. To said plunger there is assigned a rotary piston 12.1, which has an external diameter d1 corresponding to the internal diameter of the pump housing 2.1 up to an annular edge 20 shaped inside the pump housing 2.1. After this, the internal diameter of the housing 2.1 tapers as a result of the annular edge 20 and corresponds to an external diameter d2 of the plunger 7. As can clearly be seen in FIG. 5, the plunger 7 hence has the possibility of penetrating deep into the inner vault 18 of the rotary piston 12.1, so that substantially more flowable mass can be pushed out of the outlet opening 14 and, moreover, possible unwanted build-ups in dead spaces of the inner vault 18 are destroyed.

Figure 6:
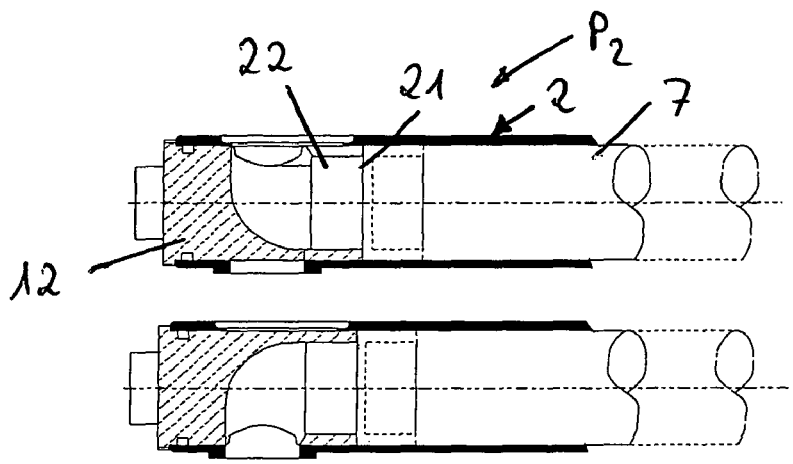
Figure 7:
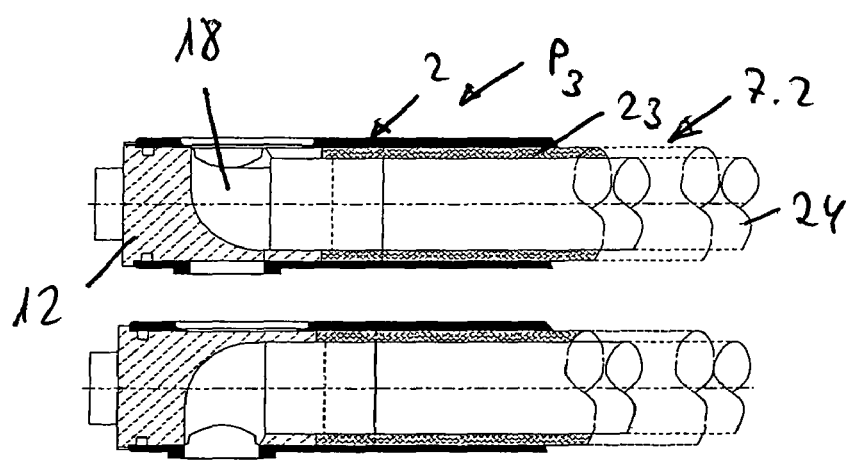

A similar purpose is also served by the embodiments of the pumps P2 and P3 according to FIGS. 6 and 7. In the embodiment according to FIG. 6, the plunger 7, corresponding to that according to FIGS. 3 and 4, additionally has mounted on its end face 21 a cylindrical attachment 22, which, in turn, also reduces the volume in the inner vault 18.

The invention claimed is:

1. A device for metering a flowable mass comprising:
   a pump comprising a housing defining a chamber having an inlet and an outlet, a rotary piston having a passage and a surface, said rotary piston being positioned in the chamber for rotary movement about an axis A in the chamber between (1) a first position wherein the inlet communicates with the chamber through the passage in the rotary piston and the outlet is closed to the chamber by the surface of the rotary piston and (2) a second position wherein the inlet is closed to the chamber by the surface of the rotary piston and the outlet communicates with the chamber through the passage in the rotary piston, a plunger mounted in the chamber in opposition to the rotary piston and defining with the housing and the rotary piston a pump chamber, a lifting bar movable in a direction along axis A toward and away from the rotary piston for moving the flowable mass from the inlet to the outlet, the passage comprises a recess configured in an open slot, the housing forms in an interior an annular edge against which a front edge of the rotary piston bears, the rotary piston has an external diameter $d_1$ corresponding to an internal diameter of the chamber in the housing upstream of the annular edge, and the plunger has an external diameter $d_2$ corresponding to the internal diameter of the chamber in the housing downstream of the annular edge, the annular edge is formed by a sleeve, the front edge of the rotary piston lies opposite the plunger and is curved in the shape of a horseshoe, the front edge is adjoined by a conchoidal inner vault which is followed by a cylindrical portion, and the conchoidal inner vault has side edges which run linearly and horizontally away from the front edge.

2. The device as claimed in claim 1, wherein the plunger is movable in a direction x wherein a portion of the plunger is received in the recess.

3. The device as claimed in claim 2, wherein an end face of the plunger has an attachment.

4. The device as claimed in claim 1, wherein the plunger comprises an outer plunger and an inner plunger.

5. The device as claimed in claim 1, wherein the side edges are disposed in the region of the inlet and outlet.

6. The device as claimed in claim 1, wherein the pump housing is fixedly mounted.

7. The device as claimed in claim 1, wherein the rotary piston has a rotary drive.

8. The device as claimed in claim 7, wherein the rotary drive comprises a gearwheel engaging with a movable gear rack.

9. The device as claimed in claim 8, wherein a plurality of pump housings and rotary pistons are arranged adjacent to one another and each rotary piston has a gearwheel engaging with the movable gear rack.

10. The device as claimed in claim 9, wherein a plurality of plungers are arranged adjacent to one another and are connected to the lifting bar by which the plungers are linearly movable.

* * * * *